Figure 1:
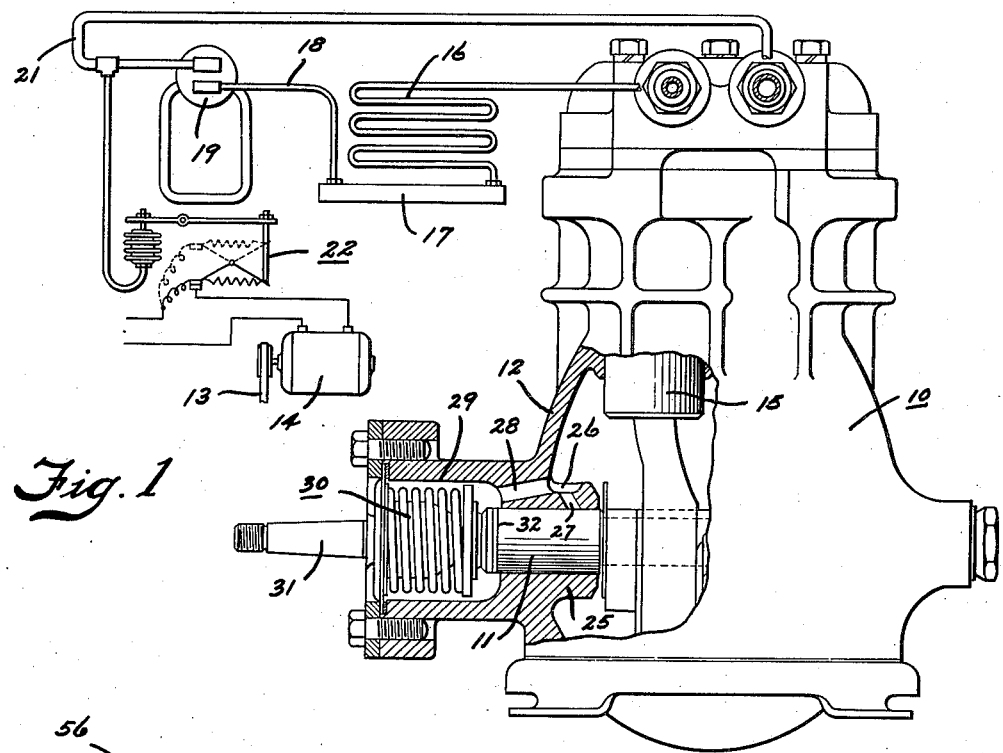

Feb. 15, 1938.　　　G. F. WEIHER　　　2,108,760

SEAL FOR REFRIGERATING APPARATUS

Filed Nov. 25, 1936

INVENTOR.
GEORGE F. WEIHER
BY
Spencer, Hardman and Zehr.
HIS ATTORNEYS.

Patented Feb. 15, 1938

2,108,760

UNITED STATES PATENT OFFICE 2,108,760

SEAL FOR REFRIGERATING APPARATUS

George F. Weiher, Dayton, Ohio, assignor to General Motors Corporation, Dayton, Ohio, a corporation of Delaware Application November 25, 1936, Serial No. 112,762

2 Claims. (Cl. 286—7)

This invention relates to refrigerating apparatus and more particularly to the sealing of refrigerating systems.

It is of utmost importance that refrigerating systems be sealed. Where a motor which is separate from a compressor is used in such systems to drive the compressor it is necessary to provide a seal for the extending portion of the compressor shaft. Such shaft seals have always been rather difficult problems and the problems of shaft seals are particularly difficult in refrigerating systems. This is because a seal of this type must be fluid tight and must also be brought into perfect alignment with its seat in order to provide a leak-proof joint at the extending portion of the compressor drive shaft, and this means that considerable friction is present thus necessitating lubrication of the joint. Obviously seals of this type divide the air on the outside of the compressor from fluid on the inside of the compressor. In seals of the type herein described it has been customary to employ a bellows or the like device and to secure one end of this bellows to a part of the seal and to fasten the other end of the bellows to a wall of the compressor crankcase in fluid-tight contact therewith. The bellows employed in such seals have been expensive and at times are the source of considerable trouble. Many attempts have been made to eliminate the bellows from seal structures but in so doing other difficulties have been encountered to discourage their elimination. One of these difficulties is the construction of a structure devoid of a bellows and which structure will form a perfect seal even though the seal structure is not in exact alignment with the sealing surface ordinarily provided on the compressor drive or crankshaft.

It is therefore an object of my invention to provide an improved seal for the drive shaft of a compressor of a refrigerating system which will be simple in construction and yet strong and durable.

It is another object of my invention to provide an improved seal for the drive shaft of a compressor of a refrigerating system which will effectively seal fluid in the compressor and which does not require perfect alignment with the sealing surface on the compressor shaft.

A further object of my invention is to provide an improved seal for a compressor of a refrigerating system which can be manufactured at low cost and which construction prevents the seal from creating objectionable noises during operation of the compressor.

Further objects and advantages of the present invention will be apparent from the following description, reference being had to the accompanying drawing, wherein a preferred form of the present invention is clearly shown.

Figure 2:
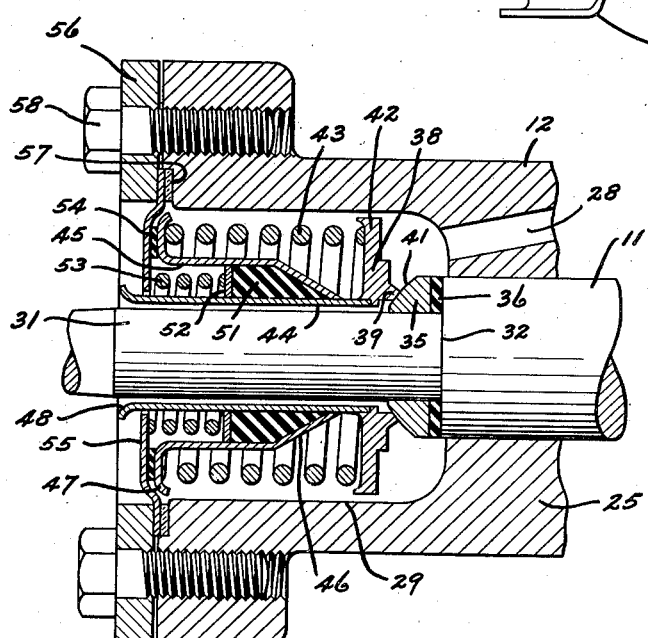

In the drawing:

Fig. 1 is a view of a refrigerating system, partly diagrammatic, including a compressor provided with a shaft seal constructed according to my invention; and Fig. 2 is an enlarged vertical sectional view of the shaft seal shown in Fig. 1.

I have disclosed in Fig. 1 of the drawing a refrigerating system provided with a conventional reciprocating refrigerant compressor 10, preferably containing a refrigerant and lubricant such as sulphur dioxide and a mineral oil, which is provided with a drive shaft 11 which projects outwardly of the crankcase 12 of the compressor to receive a pulley (not shown) which is driven, through the medium of a belt 13, by a separate electric motor 14. Pistons 15 of the compressor 10 draw evaporated refrigerant into the crankcase 12 and discharge the compressed refrigerant through the head portion of the compressor to a condenser 16. The compressed refrigerant received in condenser 16 is cooled and liquefied, with the aid of any suitable cooling medium, from where it flows and is collected in the receiver 17. From the receiver 17, the liquefied refrigerant is forwarded through a supply conduit 18 to an evaporating means or cooling element 19 shown as the conventional float control flooded type. The liquid refrigerant evaporates within the element 19 under reduced pressure, created by operation of the compressor 10, and is returned to the compressor crankcase through a gaseous refrigerant return conduit 21. The operation of the electric motor and consequently compressor 10 is controlled by a switch means 22 preferably of the snap-acting type in accordance with the temperature and pressure of the evaporating means 19 as is conventional in the art.

The wall of the crankcase 12 of compressor 10 is provided with a bearing 25 which receives one end of the drive shaft 11 and which is provided with a lubricant receptacle 26 for collecting a portion of the lubricant splashed about within the crankcase of compressor 10. This receptacle 26 is provided with an oil passage 27 extending to the bearing surface of bearing 25 and a second passage 28 leading to a cavity or hollow boss 29 provided on the wall of the compressor crankcase 12 and surrounding the outer end of the drive shaft 11. Within the hollow boss 29 there is provided a shaft seal generally designated by the reference character 30 which surrounds the reduced end portion 31 of the compressor drive shaft 11 extending from a shoulder 32 formed on the bearing portion of the shaft.

Referring now more particularly to Fig. 2 of the drawing it will be noted that there is a nitralloy ring 35 surrounding the reduced portion 31 of the shaft 11. This ring 35 is nitrated and hardened and has its opposite faces ground to provide a flat smooth hard surface on one side thereof and a smooth hard curved or spherical surface on the other side thereof. Interposed between the shoulder 32 on shaft 11 and ring 35 there is a rubber-like gasket type ring which seals the ring 35 to the shaft to cause same to rotate with the shaft. This rubber-like ring 36 fits tightly between the inner surfaces of the nitralloy ring 35 and the reduced portion 31 of shaft 11 to seal the refrigerating fluid within compressor 10.

I have found that a certain compound of a substance generally called chloroprene is best suited for rubber-like elastic seals for refrigerating systems. This compound is made of the following materials:

| | Parts by weight | Percent by weight |
|---|---|---|
| Chloro-2-butadiene-1,3 | 100 | 38.2 |
| Litharge | 50 | 19.1 |
| Zinc oxide | 2 | .8 |
| Abietic acid | 2½ | .9 |
| Lamp black (amorphous carbon) | 100 | 38.2 |
| Refrigerator oil (mineral oil) | 5 | 1.9 |
| Sulphur | 1 | 1 |

These materials are mixed, milled on a mill, calendered to thickness, laid in molds and cured by pressure, heat and time. I find that this elastic rubber-like material withstands the action of refrigerants, particularly moist sulphur dioxide, with the least amount of swelling or deterioration. It is therefore useful whenever it is desired to use a rubber-like or resilient sealing material between other materials where resistance to deterioration of certain chemicals and lubricants and a minimum of swelling or deformation is desired.

Contacting the opposite spherical or curved face of the nitralloy ring 35 is an annular member 38 provided with a seal face 39 curved or concaved to match or correspond with the spherical sealing face 41 formed on ring 35 and which abuts this sealing ring face 41. This member 38 is provided with a flange 42 against which one end of a spring 43 abuts. The member 38 is preferably formed of a special bronze material possessing lubricating properties and which is now conventional and well-known to those skilled in the art. The member 38 has a tube-like element 44 secured thereto in any suitable manner and which element surrounds the reduced portion 31 of shaft 11. A collar 45 surrounds tube 44 and is provided at its inner end with a cone-shaped portion 46 which terminates closely adjacent or abuts the wall of tube 44. The opposite end of collar 45 is formed outwardly as at 47 to provide an abutment for the outer end of spring 43. The outer end of tube 44 is flared outwardly as at 48 after spring 43, collar 45, a resilient member 51, a washer 52, a spring 53, a resilient washer 54 and an end plate 55 have been placed thereon to provide the assembled shaft seal structure 30. The end plate 55 of the sealed structure 30 is clamped, by a suitable clamping gland 56, resilient washer 57 and bolts 58 to the end portion of the compressor crankcase 12 adjacent the cavity or hollow boss 29. The spring 53 is compressed between washer 52 and end plate 55 to apply pressure to the resilient member 51, which member is preferably formed of a resilient material similar to the material of ring 36, to thereby force member 51 into tight sealing engagement with tube 44 and the cone-shaped portion 46 of collar 45 to seal the structure at this point. Washer 54 is also preferably formed of the same material as ring 36 so as to provide a resilient seal between end plate 55 and the flange 47 on collar 45. The stationarily mounted end plate 55 causes spring 43 to apply its compression force against the member 38 to thereby tightly abut the sealing surface 39 formed thereon against the sealing face 41 of the nitralloy ring 35 to thereby seal the fluid in compressor 10 against leakage at the drive shaft opening.

The elements of the shaft seal 30 are constructed and arranged so that when the sealing surface 39 thereof is clamped into engagement with ring 35 the end plate 55, collar 45 and other elements associated therewith are moved inwardly of the flared end 48 of tube 44. The arrangement of the parts of the shaft seal 30 is such that the provision of the curved sealing surfaces 39 and 41 affords a seal that is self-aligning and capable of being manufactured beyond close limits. Obviously seal 30 is of such character that elements thereof can be moved away from or toward one another even though the seal is devoid of an expansible and contractible bellows member. The resilient elements in the shaft seal 30 are disposed and arranged in certain positions to prevent vibrations of parts of the seal, ordinarily set up during operation of the compressor due to friction at the sealing surfaces, and consequently noises generated by the vibrating parts are therefore deadened. The provision for moving the member 38 relative to the stationary end plate 55 of my improved shaft seal permits the curved sealing surfaces 30 and 41 thereof to be in tight engagement with one another at all times irrespective of variations in the distance between the seal ring 35 and the outer finish surface to which end plate 55 is attached.

It will be seen that I have provided an improved shaft seal for compressors or the like and that the seal is of simplified construction, effective, practical and capable of long life. The shaft seal structure comprises a plurality of elements that are formed from sheet metal stampings or punchings to thus reduce manufacturing costs. The improved seal is devoid of the usual expansible and contractible bellows which at times has been a source of considerable trouble and yet is self-aligning irrespective of wide differences in dimensions of parts of the seal. The nitralloy seal ring of the improved shaft seal, by being separate from the compressor shaft, and the seal member engaging the nitralloy ring can both be readily removed and replaced when worn without requiring complete disassembling of the compressor. The improved shaft seal may therefore be applied to existing compressors having worn shaft shoulder surfaces which have formed one sealing surface of a shaft seal removed therefrom.

While the form of embodiment of the invention as herein disclosed, constitutes a preferred form, it is to be understood that other forms might be adopted, all coming within the scope of the claims which follow.

What is claimed is as follows:

1. In combination, a compressor including a crankcase having an opening in a wall thereof, a rotary shaft extending through the opening, means forming a shoulder on the shaft, a member surrounding the extending portion of the shaft and having a sealing surface adapted to engage the shoulder forming means on the shaft, means for urging the sealing surface on said member against the shoulder forming means on the shaft, means interposed between said member and said compressor crankcase for sealing the shaft gas tight at the opening in the crankcase, said last named means comprising a rigid tubular element having an end thereof secured to said member and extending outwardly therefrom, a rigid collar surrounding the extending portion of said tubular element and being slidable relative thereto, a plate clamped to said crankcase, means for sealing said collar to said tubular element, and means for urging said sealing means into tight engagement with the said tubular element and said collar.

2. In combination, a compressor including a crankcase having an opening in a wall thereof, a rotary shaft extending through the opening, means forming a shoulder on the shaft, a member surrounding the extending portion of the shaft and having a sealing surface adapted to engage the shoulder forming means on the shaft, means for urging the sealing surface on said member against the shoulder forming means on the shaft, means interposed between said member and said compressor crankcase for sealing the shaft gas tight at the opening in the crankcase, said last named means comprising a rigid tubular element having an end thereof secured to said member and extending outwardly therefrom, a rigid collar surrounding the extending portion of said tubular element and being slidable relative thereto, a plate clamped to said crankcase, means for sealing said collar to said tubular element, means for urging said sealing means into tight engagement with the said tubular element and said collar, and means forming a seal between said collar and said plate.

GEORGE F. WEIHER.